Jan. 5, 1965 J. RABINOW 3,164,806

CONTINUOUS REGISTER READING MACHINE

Filed Nov. 30, 1961 2 Sheets-Sheet 1

INVENTOR
Jacob Rabinow
BY Joseph A. Genovese & Max L. Libman
ATTORNEY

INVENTOR
Jacob Rabinow
BY Joseph A. Genovese &
Max L. Libman
ATTORNEY 3,164,806

CONTINUOUS REGISTER READING MACHINE

Jacob Rabinow, Takoma Park, Md., assignor, by mesne assignments, to Control Data Corporation, Minneapolis, Minn., a corporation of Minnesota Filed Nov. 30, 1961, Ser. No. 156,055
12 Claims. (Cl. 340—146.3)

Figure 1:
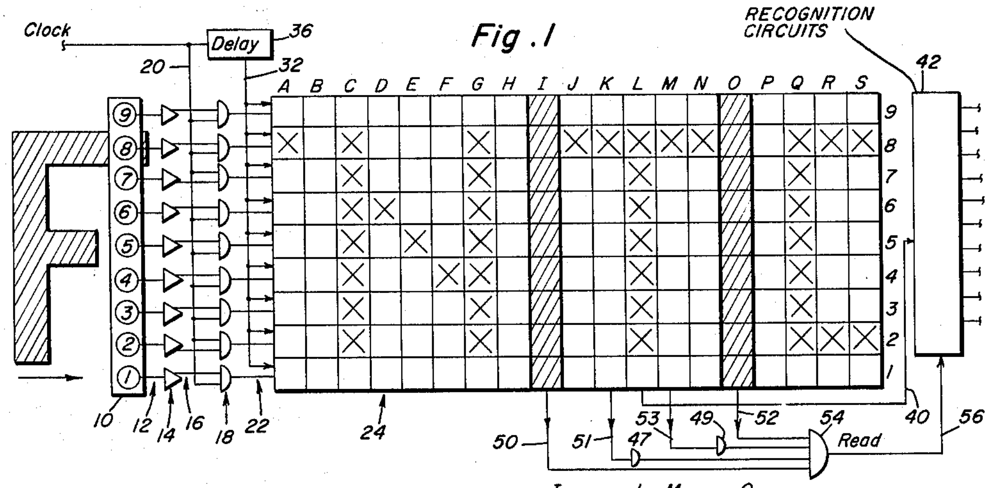

This invention relates to reading machines and particularly to an improved technique for processing character-identity data derived from the characters as they are examined by a conventional examination device.

The term "character" as used herein is defined as any letter, numeral, symbol, pattern, word, portion of a pattern, word, etc., capable of being recognized by machine. The terms "prelook" and "prelook station" as used herein, mean an advance examination (or examination station) where the characters, or their images, or character-defining data, etc., are examined to ascertain a characteristic, or peculiarity (such as character spacing) of the characters in advance of another procedure. Ordinarily, "prelook" is used to obtain information other than the identity of the characters.

At this stage of the development of the art of identifying characters by machine, there are numerous philosophical approaches to reading. Some of these have been implemented by the construction of operative machines. I have designed and helped to construct a number of different types of reading machines, some of which are capable of identifying characters at enormous speeds, and others at slower speeds.

One type of high-speed machine was built like the reading machine described in Patent No. 3,104,369 of J. Rabinow et al. My present invention provides an improvement in certain of the features used in that kind of machine. However, my invention has considerably broader application since it may be used with many other machines. To more readily understand my present invention, the following discussion is in terms of the type of machine disclosed in Patent No. 3,104,369. I emphasize, though, that the machine disclosed in that patent is given only as background material and is not intended to be a limitation on my present invention.

The machine disclosed in the above patent uses a multi-photocell scanner as an examination device for individual characters. These characters may, as is ordinarily the case in printed material, be arranged in columns or in words and the words arranged in lines. The scanner is composed of a vertical row of photocells, assuming that the characters move horizontally. The amplified outputs of the photocells are gated with a clock signal to have successive vertical scans of the characters and their background.

The scan information is gated into a shift register of sufficient capacity to store an entire character. When the register is loaded with a single character, i.e. the character-defining data from the scanner, the shift register is shifted downward until the lower edge of the character reaches the lowermost position in the register. It is necessary to definitely locate the character-defining data in the register because the data is read out over permanent wiring which is connected to predetermined stages of the register and to data-correlation devices. For the purposes of my present invention, the correlation devices may be considered as a part of the recognition circuits of the reading machine. When the character-defining data is read out of the register, a "read" trigger signal (referred to herein as a "timing" signal) triggers the recognition circuit to identify the character on the basis of the character-defining data in the predetermined position in the register.

An object of the present invention is to greatly simplify the handling of the character-identity data in the register and to simplify the register itself and its control circuitry. It is a comparatively expensive and time-consuming procedure to load the register with the character-identity data; make sure that the entire character is loaded into the register; then shift to a predetermined position (usually the bottom of the register) before using the character-identity data in the register by applying it to te recognition circuits. Furthermore, some difficulty was encountered when shifting the register down because the machine relied on detection of the lowermost part of the character at the last horizontal stage of the shift register, to stop the down-shifting. Occasionally a piece of "dirt" below the character on the document will be scanned and there will be a bit of information in the register corresponding to the dirt. Thus, when shifting down, the register ordinarily has no way of knowing that the particle of dirt bit reached the bottom of the register and stopped the down-shift cycle. Patent No. 3,104,369 discloses means for attenuating, if not completely obviating this problem. However, these means require additional time to cycle and entail some additional expense.

Another object of my invention is to provide a register preferably of a capacity greater than that required for a single character and to continually load the register with one set of character-identity information after the other without stopping the register-loading procedure from character-to-character. The horizontal position of the character is detected "on the fly," i.e. as it continues to move through the register.

In one embodiment of my present system I do not shift the character-data down in the register. Instead, I provide multiple groups of tie points between the register and two or more separate correlation devices for each character represented in the recognition circuit. This does require additional wiring and correlation devices but has the great advantage of eliminating the means to shift the register down and, very important, consumes no operational time as does shifting the character-data down in the register. The multiple sets of tie points and additional correlation devices are like the multiple sets disclosed in application Serial No. 115,267 of J. Rabinow and entitled Non-Scanning Reading Machine.

It is not a simple matter in reading machines to determine where a character begins and where it ends. Some characters are printed very close together and other characters actually touch or overlap. Since reading machines ordinarily rely on the clear white vertical space between characters to tell when one character ends and another character begins, it is obviously impossible by ordinary means to rely on this technique when the characters are touching.

I have shown several ways of overcoming this problem in application Serial No. 68,892 filed on November 14, 1960 and entitled Method and Means for Determining Separation Between Characters. In that application I rely on a "prelook" examination device near the scanner. This is a perfectly satisfactory method but requires an additional scanning head whose position must be closely controlled with respect to the main scanning head. Paper stretch problems and uneven character spacing can influence the effectiveness of this technique.

By having a wide register capable of storing the widest expected character and adjacent spaces or storing two or more characters, or a word or words, and by having the character-defining data continually gated into and rippled through the register at a speed corresponding to the movement of the document containing the characters, I overcome these difficulties by using a part of the register itself as a source of information to detect the separation between characters.

The philosophy of the invention described in my application Serial No. 68,892 is to examine a plurality of characters and detect the average spacing of those characters which actually have a clear white space between them. This average spacing is used to derive a signal whose frequency is compared with an oscillator source. The oscillator is a portion of a flywheel circuit which is adjusted to the average spacing of characters. Thus, when occasional touching characters occur, the flywheel circuit will continue to operate and provide an artificial timing signal just as though a space actually existed between the touching characters. As my present invention uses the timing signal it has the effect of triggering the recognition circuits for a predetermined section of the register at the proper instant when the unknown character is at the correct horizontal position.

In my present invention the flywheel method of producing timing signals may be used in place of, or in addition to the direct methods of developing timing signals, as explained below. Direct methods seek the clear white space between the character-defining data as the data continuously passes through the register. Both methods offer a number of possible procedures. For instance, the register may be interrogated at only one position thereof and when a clear space is detected, the timing signal is provided to use the character-data to the left (or right) of the interrogation station. I may use two horizontally spaced interrogation stations and require the outputs of either one or the other to detect the clear white space between characters. For additional safety I can combine these outputs and require both interrogation stations to detect the clear white spaces on both sides of a character. For further protection I can have one or more additional interrogation stations between the character-space seeking stations, and have these look for a portion of a character. For even greater certainty, I can postulate that there must be a white space on both sides of the character and also a piece (or pieces) of the character therebetween before I determine that the unknown character is in the proper position for triggering the recognition circuits.

Many characters have different widths (horizontal dimension), for example, an *"i"* and a *"g."* It is not ordinarily possible to know beforehand whether the character spacing between adjacent characters is going to be wide or narrow, either because the character itself is narrow or wide, or because of uneven character spacing. However, the above described methods of producing timing signals are not affected by this problem. Furthermore, the above interrogation stations can be made any width, and specifically, where a register is used, the character-space seeking stations may each be made of two or more columns. The outputs (signifying a space) can be either AND gated or OR gated before being used to have the respective effects of requiring both or either column to "see" a space before an operative signal is produced.

Accordingly, a further object of my invention is to provide a reading machine register which is continuously loaded with character-defining data as characters are examined, and to have means interrogating portions of the register for the space between characters.

A further object of the invention is to use various techniques for the above register-interrogation, and for combinations of the different techniques.

Other objects and features of importance will become apparent in following the description of the illustrated forms of the invention.

FIGURE 1 is a diagrammatic view showing various sections of a character reading machine having a data processing register in accordance with my present invention.

Figures 1A, 1B:
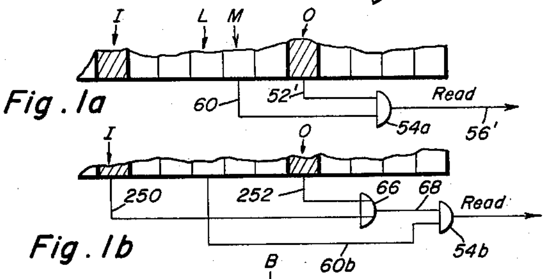

FIGURE 1*a* is a fragmentary diagrammatic view showing a modification of the means for deriving a "read" signal from the character defining information as it passes through the register of FIGURE 1.

FIGURE 1*b* is a view similar to 1*a* and showing a further modification.

Figure 1C:
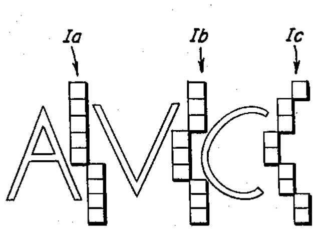

FIGURE 1*c* is a schematic view showing various possible shapes of interrogation columns in the register.

Figure 2:
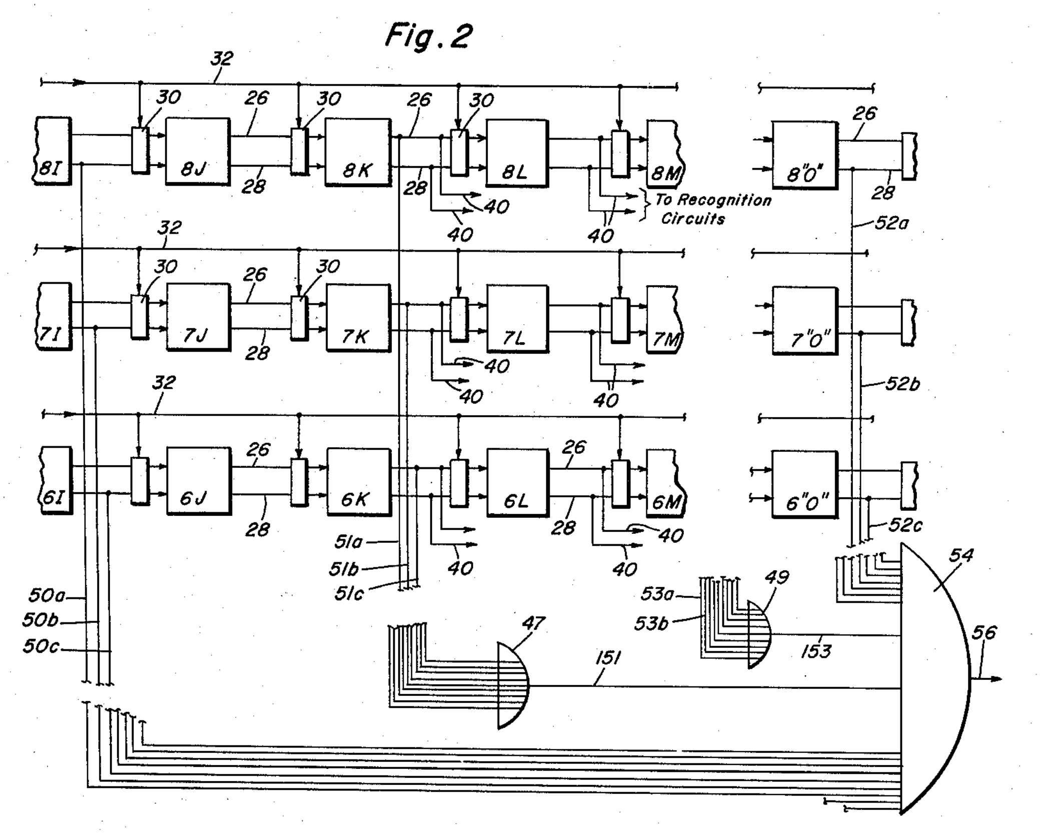

FIGURE 2 is an enlarged fragmentary view of the register in FIGURE 1.

Figure 2A:
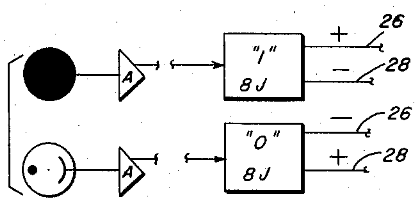

FIGURE 2*a* is a diagrammatic view showing the operation of one stage of my register.

Figure 3:
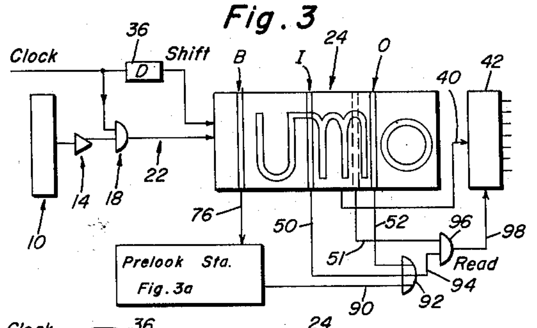

FIGURE 3 is a diagrammatic view showing a further modification.

Figure 3A:
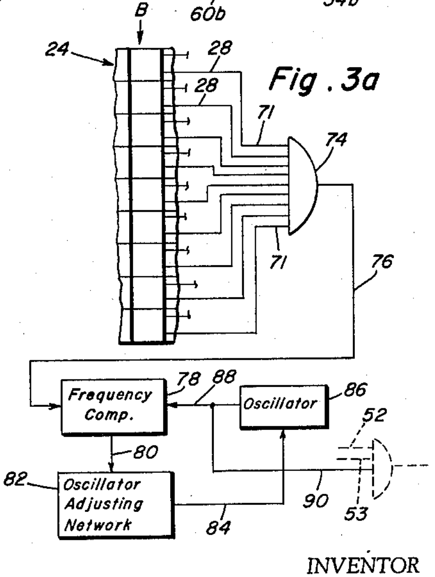

FIGURE 3*a* is an enlarged detail of one of the features of the embodiment in FIGURE 3.

Figure 3B:
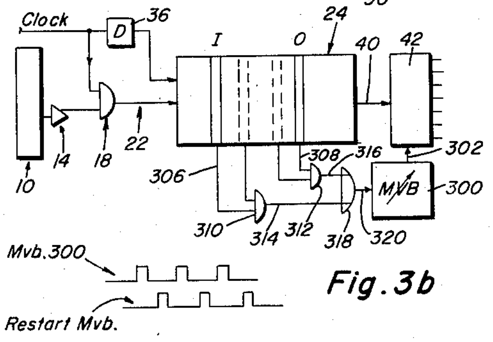

FIGURE 3*b* is a modification of the means to provide timing signals.

Figure 4:
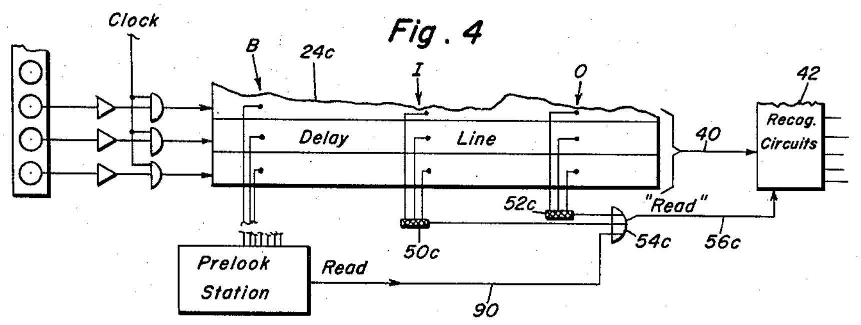

FIGURE 4 is a fragmentary diagrammatic view showing that the register need not be made of bistable devices as in FIGURE 2, but may be made of other devices such as delay lines.

*Background*

As discussed previously, my invention is concerned with handling character-defining data after it is derived from the characters and before it is applied to the recognition circuits of a reading machine. In order to more clearly understand the nature of my invention I have selected one reading machine, i.e. the machine disclosed in copending application Serial No. 32,911, as background material. In general, that machine has an examination device 10 (FIGURES 1, 3, 3*a* and 4) composed of a vertical row of photocells having the effect of examining a character by vertical scan lines while the character is moving horizontally. Since the examination device is made of a number of individual photocells, the net result of the examination is a complete coverage of the entire "map," i.e., the character and its background. The outputs of the photocells are conducted on lines 12 having amplifiers 14, and the amplified outputs on lines 16 to provide individual inputs to AND gates 18. The AND gates are two-entry gates with the information lines 16 constituting one input, and a clock pulse conducted on lines 20 providing the other input of each. By clocking the AND gates in this way, the effect is to clock the examination device 10, in time with the horizontal movement of the characters of a document.

The output lines 22 from AND gates 18 are information conductors. If a photocell "sees" a portion of a character, its gate will conduct a signal signifying this, for instance, a signal representing a binary "1" (shown as X's in FIGURE 1). If the photocell sees a part of the character background, the output signal on the pertinent line 22 will conduct an information signal signifying this, for instance a binary "0." All of these signals for one "scan line" are conducted simultaneously on lines 22 and applied to a register. This is the point at which my invention differs from prior reading machines.

*Invention*

My register 24 is constructed of usual components but it functions in an unusual manner in a reading machine. The register shown has nine horizontal rows 1–9, each having stages A–S. The number of either or both of the rows and a stage can be decreased or increased, but there is one horizontal row of stages for each photocell of the examination device 10. Each horizontal row in the register is a single-tier shift register and the entire register 24 is a matrix of the nine illustrated shift registers 1–9.

For the purpose of explanation, assume that the shift register 24 is constructed somewhat like the shift register in Patent No. 3,104,369, except that I have eliminated the means to shift the data downward. However, if desired the down-shift feature can be used. I have shown a portion of register 24 in FIGURE 2 enlarged and in more detail. Each flip flop, for instance flip flop 8J (FIGURE 2*a*) has two output wires 26 and 28. The design is such that when the flip flop stores a binary "1" the wire 26 conducts a given signal (say +6 v.), and the wire 28 conducts its complement (−6 v.). When the flip flop stores a binary "0" the signals on wires 26 and 28 are reversed. We can assume that when a photocell "sees black" (part of the character), a "1" will be stored in its corresponding single-tier register, and when the photocell sees "white" (part of the character background) a "0" will be stored. When a shift signal occurs on line 32 (FIGURE 2) to horizontally shift the register, conventional steering circuits 30 connected with lines 26 and 28 of each register stage, are actuated to step the state of one stage to the next adjacent stage.

The shift pulse lines 32 are connected with the clock pulse line 20 through a delay 36 (FIGURE 1) so that when each of the initial flip flops (column A) is loaded, the previously stored information of column A is shifted to stage B. Then when the next clock pulse occurs, the gates 18 are simultaneously interrogated to apply a new group of data to column A. Almost instantaneously the last-mentioned clock pulse (through delay 36) is conducted on lines 32 and shifts the data in column B to column C, and at the same time, the data in column A to column B. This procedure continues in time with the horizontal motion of the characters and their background. The result is that the character-defining data is continuously loaded into register 24 and passes horizontally (as shown) to the right. I have shown my register 24 loaded in parallel because this is inherently faster than serial loading. However, register 24 can be serially loaded. An important distinction between my register 24 and the register in Patent No. 3,104,369 is that the data in register 24 steps horizontally from stage to stage (without stopping) in time with the continual gating of new data into the register.

In the reading machine disclosed in the above patent, the character-defining data is conducted from the shift register to the recognition circuits 42 over wires 40 attached to register stage output lines 26 and 28. The selection of "assertion" and "negation" points (wires 26 or 28) is a technique described in Patent No. 3,104,369 and may be used herein but it does not have a direct bearing on my present invention. The important point is that the output lines 40 in each of the figures of the drawings correspond exactly to the output lines from the register in the above patent to the recognition circuitry reproduced diagrammatically at 42 herein. Since the output lines 40 are selected in accordance with the expected shape of given characters (for instance for the letter "T" shown in FIGURE 1 the assertion wires 26 of stages 8J, 8K, 8L, 8M, 8N, and 7L, 6L, 5L, 4L, 3L, 2L, would be selected) it is essential that the character-defining data be precisely located (vertically and horizontally) at the instant of triggering the recognition circuits. If the character-defining data were a little to the right or a little to the left (from the position shown in FIGURE 1) at the time of read-out, the wires 40 would not conduct signals corresponding to a true image of the character.

Therefore, I have made my register 24 longer than is necessary to identify a single character. In FIGURE 1, I show a register of a capacity to instantaneously store approximately three characters, although for actual read-out only columns J–N inclusive are used. The additional horizontal length of the register serves two purposes; (*a*) to show that if I wish I can store a plurality of characters, a word or words, or an entire line of print, and (*b*) to provide space in the register 24 for a prelook function (described later) in those embodiments where a prelook is used.

To determine precisely when to read out the character-defining data from the register, i.e., when to develop the timing or "read now" signal for the recognition circuits 42, I interrogate one or more vertical columns of the shift register to seek the clear white space on one or opposite sides of a character. I have shown interrogation columns I and O enclosed in heavy line rectangles, and cables 50 and 52 extending therefrom. The cables contain wires **50*a*, 50*b*, 50*c*, etc., and 52*a*, 52*b*, 52*c*, etc. (FIGURE 2), which are attached to the lower (negation, i.e. "not black") wires 28 of the respective stages in columns I and O. Cables 51 and 53 contain conductors 51*a*, 51*b*, etc., and 53*a*, 53*b*, etc., respectively which are connected to the upper (assertion, i.e., "black") wires 26 of the stages of columns K and M. The wires of cables 50 and 52 are connected as specifically described above, since the clear white space (represented by binary 0's in register 24) between characters is sought at columns I and O, whereas the wires of cables 51 and 53 are attached to the upper wires 26 of the stages in columns K and M because a part of the character-data (binary 1's) is sought in each of these columns. Since columns I and O should be "entirely white," each line 50*a*, 50*b*, etc., and 52*a*, 52*b*, etc., is AND gated at 54. Since a part of the character may appear at any vertical position of columns K and M, each group of wires 51*a*, 51*b*, and 53*a*, 53*b*, etc., is OR gated at 47 and 49 respectively. The output of gates 47 and 49 on lines 151 and 153 form inputs to AND gate 54. Accordingly, when all of the entries of gate 54 are satisfied, there will be a "read" signal on line 56 to trigger recognition circuit 42**.

FIGURE 1*a* is a modification showing that I need not examine both sides of the character-defining data which is stored in the register to produce a "read" signal. I may wish to examine only one side, for instance, only column O. This view also shows that for additional security, I may select any one of the columns, J, K, L, M, N, and interrogate it (or them) for the storage of a piece of the character (black) which will then yield a signal on line 60 which is AND gated at **54*a* with the character-space indicating signal on line 52¹ to provide the read signal on line 56¹**.

FIGURE 1*b* is the same as FIGURE 1*a* except the character-space defining signals on line 250 and 252 are OR gated at gate 66, and the output on line 68 is AND gated at **54*b* with a signal on line 60*b* resulting from an interrogation of a part of the register 24** where the character should exist at the instant of reading. There are other possible permutations of this feature and the previous are given by way of example only. Moreover, the interrogation stations need not be single vertical columns. They may be made of a vertical column and/or composites I*a*, I*b* and/or I*c* (FIGURE 1*c*), in order to detect the clear white space between characters which are actually spaced but which have overlapped parts. An example of this is often found in the word "ox" when the characters are printed very close. A vertical line cannot be passed between these characters, but a left-concave line can. I have disclosed a number of scan line shapes in my application Serial No. 68,892, and each shape can be emulated herein by selection of fragments of stages of adjacent columns of the register 24. As in that application, the outputs of a group of interrogation sections (columns) can be OR gated so that if a separation between adjacent characters is found by any one of them, a timing signal is provided.

It should be noted that any combination of these separation configurations can be used simultaneously by OR-gating different desired combinations of output wires from the register cells so that if there is a clear space shown by any of these combinations, this will provide the required timing signal.

Attention is now directed to FIGURE 4 where the reading machine elements are philosophically the same as those in FIGURE 1. I have used similar reference numerals to designate parts similar to those in FIGURE 1. The major distinction is that the register **24*c* is made of conventional delay lines instead of bi-stable devices. With a delay line configuration we do not need shift pulses as on lines 32 of FIGURES 1 and 2. There are means, known in the art, for tapping a delay line anywhere along its length. Thus, the delay lines are tapped at places corresponding to columns I and O of FIGURE 1, and the character location procedure is the same as described above in connection with the embodiment of FIGURE 1. Thus, cables 50***c* and 52*c* corresponding to cables 50 and 52, contain lines that are OR gated at 54*c* to provide a read signal on line 56*c* for the recognition circuit 42. One of the advantages of a delay line system is that it is better suited for analog signals as opposed to digital signals defining the character in the register. Other features shown in FIGURE 4 are described later.

*Prelook Feature*

FIGURES 3, 3*a* and 3*b* show how the register 24 may be used to advantages other than those described above. The register in these views is the same as the register in FIGURE 1, although a delay line register (FIGURE 4) could be used. In any of my embodiments I can use a portion of the register as a pre-look station. Thus, the vertical column B of register 24 (FIGURES 3 and 3*a*) is shown as a pre-look investigation means just as the additional scanning head is a pre-look device in the J. Rabinow co-pending application Serial Number 68,892 entitled "Method and Means for Determining Separation Between Characters." Further, the prelook station column need not be vertical; it may be shaped as any or any combination of vertical columns and/or those shown in FIGURE 1*c*. In the last-mentioned application I describe several fly-wheel circuits to determine the average spacing between characters and derive a timing (read) signal to correspond thereto. One of the advantages is to solve a realistic problem in optically reading (by machine) ordinary print where some of the characters touch each other and/or there is no clearly defined vertical space between characters. To a reading machine, touching characters will appear as one single character, for example, the U and M in FIGURE 3, and the machine will ordinarily reject both of the touching characters or provide an erroneous result.

FIGURES 3 and 3*a* show how the flywheel circuit feature can be applied to register 24 of FIGURES 1, 1*a*, 1*b* or FIGURE 4, while FIGURE 3*b* (described later) shows a circuit which only resembles a flywheel circuit in its use. A portion of register 24, including column B is reproduced in FIGURE 3*a*. The lower wires 28 (FIGURE 3*a*) of the stages of column B which conduct a positive signal when "white" (FIGURE 2*a*), have lines 71 connected thereto, and these are AND gated at 74. Lines 71 correspond, for example, to lines 50*a*, 50*b*, 50*c*, etc., in FIGURE 2 but are used for a different purpose. Gate 74 requires all of the stages of register column B to "see white" (FIGURE 2*a*) before the gate 74 is satisfied. When it is satisfied there is an output signal on line 76 which is applied to a frequency comparator 78. The output of the frequency comparator is conducted on line 80 to an oscillator adjusting network 82. Its output signal is conducted on line 84 to adjust a conventional oscillator 86, for instance, a multivibrator. The multivibrator output is on line 88 to furnish the reference for the frequency comparator 78 to compare with the frequency on line 76. Thus, the fly-wheel circuit timing signal is on line 90 which is connected to line 88.

The fly-wheel timing signal can be applied directly to the recognition circuits 42, or it may be combined with other signals such as shown in dotted lines to the right of FIGURE 3*a*, or shown in FIGURE 4 where it is OR gated with the "white-space" signals on lines 50*c* and 52*c*. It may be used in other combinations, a comprehensive one of which is shown in FIGURE 3. This is given by way of example only, and includes lines 50, 52 which are OR gated at 92 with the fly-wheel timing signal on line 90. The output line 94 of OR gate 92, then has the effect of requiring a clear white space directly ahead of the character to be read, or an artificial timing signal derived from the fly-wheel circuit. For greater security, the signal on line 94 (as shown) may be AND gated at 96 with line 51 and/or line 53 to provide a new signal on line 98 which is applied to trigger the recognition circuit 42. The line 51 interrogates any portion of the register where the character should appear at the instant of reading, as described previously.

FIGURE 3*b* shows another way to provide timing signals for the recognition circuits, including those necessary to read touching characters. I have a manually adjustable frequency multivibrator 300 whose output on line 302 provides the timing signals for recognition circuits 42. The adjustment of the multivibrator is made to correspond to the average spacing of characters on a document, for example eight, ten, twelve, etc., to the inch. Thereafter timing signals are provided at a corresponding frequency. If it were certain that all characters would be uniformly spaced and would be of the same width, nothing further would be required. Unfortunately this is not the case, and so I do the following:

I have two vertical inspection stations at, for example, columns I and O in register 24 of FIGURE 3*b* (and/or those shown in FIGURE 1*c*). The loading and operation of this register is the same as in FIGURE 3. The conductors (one for each stage) in cable lines 306 and 308 for columns I and O conduct signals when there is a binary representation of "white," i.e. the character background spacing, at all of these stages. The signals on lines 306 and 308 are AND gated at 310 and 312 with "black," i.e. a binary representation of a piece of a character, at columns J and N, or any other selected register columns between the space-seeking columns I and O. The output lines 314 and 316 or gates 310 and 312 are OR gated at 318 to provide a new signal on line 320. The signal on line 320 serves the important function of restarting the multivibrator 300. By "restarting," I mean that the multivibrator is recycled at the same frequency, but the beginning of the pulse train may be at a different time (with respect to the horizontal motion of the document) as shown by a comparison of the curves below FIGURE 3*b*. This has the following effect. Assume that an *x* is followed by a space and then the letters *yz* which touch each other. As the *x* just passes column I there will be a timing signal on line 302, provided by the output of satisfied gate 310. The multivibrator will be recycled because of coincidence at gate 310 and provide an ensuing signal on lines 314 and 320 to the multivibrator 300. The restarting of the multivibrator means that there will be another timing signal one character width later, and this will occur at the time that the *y* is in the read area of register 24 (between columns I and O) even though the *y* and *z* are touching. At the time that the *y* is read out of the register there is no space between the *x* and *y* (they are touching) to restart the multivibrator, so it will continue to operate and produce a timing signal at the proper instant to read out the *z* (when it is in the read area of register 24). Assume that a space follows the *z*, then, the multivibrator 300 would again be restarted, and the above procedure would continue.

The gating at 310, 312 and 318 is slightly different from corresponding gating in FIGURES 1, 1*a*, 1*b* and 3 to show another possible arrangement. Also, this arrangement, as well as the others, are suitable for reading backwards and/or forwards, i.e. whether the character data flows always from the left (as shown) or always from the right (not shown) or alternately or selectively left and right.

As examples of character-space seeking columns in the register 24 I have arbitrarily selected columns I and O. Other columns spaced apart a distance sufficient to accommodate the widest expected character may be selected. Moreover, I need not use single columns. For instance, the outputs of adjacent columns H and I and/or O and P (or more) could be OR gated and the individual outputs from the two OR gates used as character-space detecting signals. This has the effect of widening and narrowing the character area between the pairs of columns in the register to compensate for the different spacing between characters and also differences in width of characters.

It is understood that various additional changes and modifications may be made without departing from the protection of the claims. For example, where I use the terms "vertical" and "horizontal" it is to be understood that these are merely relative and not to be considered absolute.

I claim:

1. In a reading machine for a line of characters having a contrasting background, an examination device to successively examine the characters and provide successive sets of outputs corresponding to the characters and their background, and recognition means for the character; the improvement comprising a register having an input terminal for each possible output of one of said sets, said register continuously loaded with successive sets of said outputs as the line of characters is examined by said examining device, said register having a capacity in the character line direction of more than one full character and sufficient to represent the expected spaces at opposite sides of a character, and means operative while said examination device continues to load said register for providing a timing signal for said recognition means.

2. The combination of claim 1 wherein said timing signal providing means include means to interrogate said register for information in said register corresponding to the spaces between a plurality of characters and provide successive signals of a frequency corresponding to the average character spacing so that a timing signal will be provided for the expected space between touching characters.

3. In a reading machine for a line of characters having a contrasting background, an examination device to successively examine the characters and provide successive sets of outputs corresponding to the elemental areas of the characters and their background, and recognition means for the characters; the improvement comprising a register having an input terminal for each possible output of one of said sets, said register continuously loaded with successive sets of said outputs as the line of characters is examined by said examining device, said register having a capacity of more than one full character in the character line direction and the expected spaces at the front and rear thereof, means operative while said examination device continues to load said register for interrogating a part of said register at a predetermined position thereof in said line direction to detect one of the spaces between characters, means responsive to said detecting means for providing a first signal, additional detecting means to interrogate another part of said register to detect a portion of the character data in the register and provide another signal, and means to combine the last-mentioned signals to provide a timing signal for said recognition means.

4. The subject matter of claim 3 and a flywheel circuit means adjusted by the average spacing of the character-defining data moving through said register to provide timing signals for said recognition means.

5. The subject matter of claim 4 wherein said first and second-mentioned timing signals are combined to provide another timing signal.

6. The subject matter of claim 4 wherein said flywheel circuit means include means to interrogate said register for the spaces between characters ahead of the first-mentioned interrogating means with reference to the direction of movement of the character-defining data moving through said register.

7. In a character reading machine having an examination device providing outputs which correspond to the unknown characters of a line and their background, and recognition means; means to process said outputs between said examination device and said recognition means including a register which is continuously loaded with said outputs as the examination proceeds, said outputs in said register representing the characters and the spaces therebetween in the character line direction, means operative while the representations are moving through said register for detecting the space between a pair of adjacent characters, and means responsive to said detecting means for providing a trigger signal for said recognition means to read out the portion of the register occupied by the character representation at the time of said trigger signal.

8. In a character reading machine for continuous identification of characters where some characters are spaced and others touch; signal-triggered recognition means; a character examination device providing outputs which correspond to the characters and their backgrounds and the space between characters, a register, means responsive to said outputs to load character-defining data into said register continuously in time with the operation of said examining device, said register having a prelook station, means to interrogate said prelook station of said register for the space between characters as said data continues to be loaded into and moves through said register through said station, and means responsive to the average spacing between a plurality of characters for providing a timing signal for said recognition means.

9. In a character reading machine for the identifying characters of a line, a character examination device providing outputs which correspond to the characters and their background including the space between characters, a register having a capacity in the character line direction to concurrently store character-defining data corresponding to more than one character, means responsive to said outputs to load said register with character-defining data in time with the operation of said examination device, recognition means, conductive means connected with predetermined stages of said register and with said recognition means to conduct character defining data to said recognition means as said data moves through said register, said predetermined stages defining a read-out station in said register, and interrogation means connected with a part of said register on at least one side of said read-out station in said line direction to provide recognition trigger signals when said interrogation means detect character-separations in the data as said data moves through said register.

10. The machine of claim 9 wherein said interrogation means interrogate parts of said register on both sides of said read-out station thereby requiring a space on opposite sides of the character data in said read-out station for each recognition means trigger signal.

11. The machine of claim 10 wherein said interrogation means further include means to interrogate a portion of said read-out station for the presence of character defining data in said station before providing each of said trigger signals.

12. The machine of claim 9 wherein said interrogation means are ahead of said read-out station in said register and include fly-wheel circuit means to provide said trigger signals in accordance with the average spacing of characters in order to provide a trigger signal for the expected spacing between touching characters.

References Cited by the Examiner

UNITED STATES PATENTS

| | | | |
|---|---|---|---|
| 3,025,495 | 3/62 | Endres | 340—149 |
| 3,069,079 | 12/62 | Steinbuch | 235—61.11 |

OTHER REFERENCES

Pages 446, 447, 2/59, The Automatic Recognition of Typewritten Numbers, W. Dietrich.

MALCOLM A. MORRISON, *Primary Examiner.*